(12) United States Patent
Kasahara et al.

(10) Patent No.: US 9,182,816 B2
(45) Date of Patent: Nov. 10, 2015

(54) INFORMATION PROCESSING APPARATUS AND PROGRAM

(75) Inventors: Shunichi Kasahara, Kanagawa (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 399 days.

(21) Appl. No.: 13/484,871

(22) Filed: May 31, 2012

(65) Prior Publication Data

US 2012/0314047 A1    Dec. 13, 2012

(30) Foreign Application Priority Data

Jun. 13, 2011 (JP) ................. 2011-131120

(51) Int. Cl.
| A61B 3/113 | (2006.01) |
| G06F 3/01 | (2006.01) |
| G06F 3/0487 | (2013.01) |
| G06F 3/045 | (2006.01) |

(52) U.S. Cl.
CPC .............. *G06F 3/013* (2013.01); *G06F 3/045* (2013.01); *G06F 3/0487* (2013.01)

(58) Field of Classification Search
CPC ....... A61B 3/113; A61B 1/041; G02B 27/017
USPC ............ 348/77, 78, 161; 345/8; 351/209, 210
See application file for complete search history.

(56) References Cited

U.S. PATENT DOCUMENTS

| 6,152,563 A * | 11/2000 | Hutchinson et al. ......... 351/209 |
| 2009/0018419 A1* | 1/2009 | Torch .......................... 600/318 |
| 2011/0102455 A1 | 5/2011 | Temple |

FOREIGN PATENT DOCUMENTS

| JP | 62-186346 A | 8/1987 |
| JP | 6-308918 A | 11/1994 |
| JP | 2000-172163 A | 6/2000 |
| JP | 2004-314855 A | 11/2004 |
| JP | 2004-348429 A | 12/2004 |
| JP | 2006-85334 A | 3/2006 |
| JP | 2008-3816 A | 1/2008 |
| JP | 2009-294740 A | 12/2009 |
| JP | 2010-9502 A | 1/2010 |
| JP | 2010-79662 | 4/2010 |
| JP | 2011-107482 A | 6/2011 |

OTHER PUBLICATIONS

U.S. Appl. No. 13/489,652, filed Jun. 6, 2012, Kasahara.
Office Action issued Mar. 10, 2015 in Japanese Patent Application No. 2011-131120.

* cited by examiner

*Primary Examiner* — Sath V Perungavoor
*Assistant Examiner* — Patricia I Young
(74) *Attorney, Agent, or Firm* — Oblon, McClelland, Maier & Neustadt, L.L.P.

(57) ABSTRACT

An information processing apparatus includes an imaging unit, a display, a detection unit, and controller. The imaging unit is configured to capture an image to acquire a captured image. The imaging unit is configured to capture an image to acquire a captured image. The display has a display surface that faces in the same direction as an imaging direction of the imaging unit. The detection unit is configured to perform imaging processing on the captured image to detect an opening degree of eye of a user in the captured image. The controller is configured to control a presentation of the display based on a result of the detection by the detection unit.

15 Claims, 9 Drawing Sheets

INFORMATION PROCESSING APPARATUS AND PROGRAM

BACKGROUND

The present disclosure relates to an information processing apparatus including an imaging unit and a display, and to a program therefor.

In an information processing apparatus such as a PC (Personal Computer), a user operates input devices including a keyboard and a mouse with hands and fingers to execute an input operation. Further, in a tablet PC, a personal digital assistant, and the like that have been widely used in recent years, an input on a screen of a touch panel with a finger or an operator is prevailing.

In addition, an information processing apparatus in which an input operation is allowed without touching it has been developed in recent years. For example, Japanese Patent Application Laid-open No. 2010-79662 (paragraph [0017], FIG. 1) discloses an information processing apparatus that includes a range sensor and allows an input operation to be performed by a gesture of the hands of the user.

SUMMARY

In the case where an input operation is performed using the hands and fingers, however, there is a limit to operations executable at the same time. For example, in the case where a user intends to scroll the screen while inputting a text, the user has to suspend inputting of the text at least for a short period of time. In particular, in hand-held information processing apparatuses such as a tablet PC and a personal digital assistant, the user holds the information processing apparatus with one hand in many cases, so if there is an input means that is handled without using the hands and fingers, level of convenience is enhanced.

In view of the circumstances as described above, it is desirable to provide an information processing apparatus and a program that are capable of performing an input operation in which a user does not use the hands.

According to an embodiment of the present disclosure, there is provided an information processing apparatus including an imaging unit, a display, a detection unit, and a controller.

The imaging unit is configured to capture an image to acquire a captured image.

The display has a display surface that faces in the same direction as an imaging direction of the imaging unit.

The detection unit is configured to perform imaging processing on the captured image to detect an opening degree of eye of a user in the captured image.

The controller is configured to control a presentation of the display based on a result of the detection by the detection unit.

With this configuration, when the user intends to look at the display, a face of the user is imaged by the imaging unit having an imaging direction that is a direction in which the display surface faces. The detection unit detects the opening degree of eye of the user included in the captured image, and the controller controls a presentation of the display based on the opening degree of eye that is detected by the detection unit, with the result that the opening degree of eye of the user is reflected on the control of the information processing apparatus. In other words, the user can operate the information processing apparatus based on the opening degree of eye.

The detection unit may detect a face region that is a region of a face of the user in the captured image and set an eye search region that is predicted to include an eye of the user in the face region, to execute the imaging processing for the eye search region.

With this configuration, the detection unit can detect an eye of the user by performing the imaging processing on the eye search region and execute the detection of the opening degree of eye at high accuracy and high speed. It should be noted that the detection unit can detect the face region by an algorithm for detecting a human face and set an eye search region that is predicted to include an eye based on a positional relationship in the face region.

The controller may control the presentation of the display based on a change with time in the opening degree of eye.

With this configuration, the user can control the display by changing with time the opening degree of eye.

The controller may control the presentation of the display based on a difference in the opening degree of eye between a left eye and a right eye of the user.

With this configuration, the user can control the display based on the opening degrees of the right and left eyes.

The detection unit may detect an area of an eye region that is a region of an eye of the user, as the opening degree of eye, and the controller may control the presentation of the display in accordance with one of an amount of change in area and an amount of change in height of the eye region.

With this configuration, the user can control the display by changing with time the opening degree of eye.

The detection unit may detect an area of an eye region that is a region of an eye of the user, as the opening degree of eye, and the controller may control the presentation of the display in accordance with one of an area ratio and a height ratio in the eye region between the left eye and the right eye of the user.

With this configuration, the user can control the display based on the opening degrees of the right and left eyes.

The controller may change a display magnification of a display target image in accordance with one of the amount of change in area and the amount of change in height to cause the display to display the display target image.

With this configuration, the user can change the display magnification of the display target image by changing with time the opening degree of eye of the user.

The controller may fix the display magnification when the user performs an input operation.

With this configuration, when the user changes the display magnification of the display target image, the display magnification can be fixed to an arbitrary display magnification.

The controller may cause the display to display a specific layout region of a display target image when one of the amount of change in area and the amount of change in height is equal to or larger than a predetermined value.

With this configuration, the user can switch, based on the opening degree of eye, a presentation of the display between the entire display target image and only a specific layout region thereof, in a display target image including a plurality of layout regions (unit region of layout including an image and a text).

The controller may cause the display to display, as the specific layout region, a layout region of the display target image, the layout region being located at a center of the display.

With this configuration, the user can cause the display to display only a layout region that is located at the center of the display by changing the opening degree of eye.

The controller may change an application for generating a display image to be displayed on the display when one of the area ratio and the height ratio is equal to or larger than a predetermined value.

With this configuration, the user can switch to an application for generating a display image, such as an application for generating a display image in applications under operation in a multitasking manner, based on the opening degrees of eyes for the right and left eyes.

The controller may fix, when the user performs an input operation, the application for generating a display image irrespective of the area ratio and the height ratio to be obtained thereafter.

With this configuration, the user operates an application by which a display image at that time point is generated, and accordingly unintentional switching of applications can be prevented from occurring due to the change of the opening degree of eye obtained thereafter.

The controller may cause, when the opening degree of eye is detected by the detection unit, the display to display a presentation indicating that the opening degree of eye is detected.

With this configuration, after confirming that the opening degree of eye is valid, the user can perform an operation of the information processing apparatus based on the opening degree of eye.

The controller may execute calibration for a size of an eye of the user based on a maximum value of the opening degree of eye within a predetermined period of time.

With this configuration, the controller can determine a ratio of an opening degree of eye at a certain time point to that at a normal state of the user.

According to another embodiment of the present disclosure, there is provided an information processing apparatus including a detection unit and a controller.

The detection unit is configured to perform imaging processing on a captured image captured by an imaging unit to detect an opening degree of eye of a user in the captured image.

The controller is configured to control a presentation of a display having a display surface that faces in the same direction as an imaging direction of the imaging unit, based on a result of the detection by the detection unit.

As described above, according to the present disclosure, it is possible to provide an information processing apparatus and a program that are capable of performing an input operation in which a user does not use the hands.

These and other objects, features and advantages of the present disclosure will become more apparent in light of the following detailed description of best mode embodiments thereof, as illustrated in the accompanying drawings.

DETAILED DESCRIPTION OF EMBODIMENTS

Description will be given on an information processing apparatus according to an embodiment of the present disclosure.

<Configuration of Information Processing Apparatus>

Figure 1:
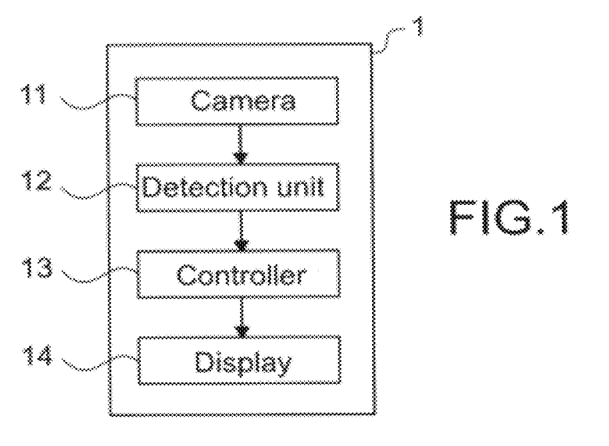
FIG. 1 is a block diagram showing a functional configuration of an information processing apparatus according to an embodiment of the present disclosure.
Figure 2:
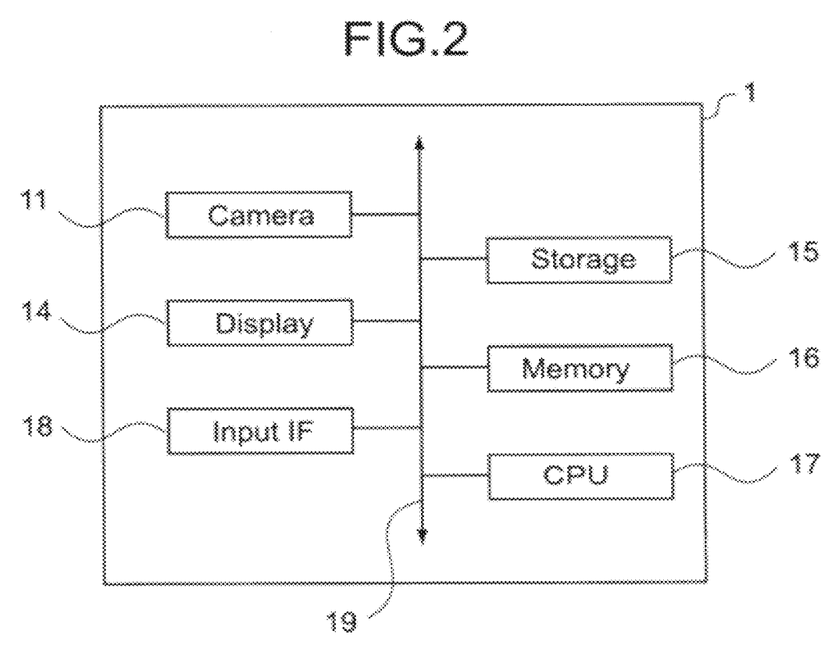
FIG. 2 is a block diagram showing a hardware configuration of the information processing apparatus.
Figure 3:
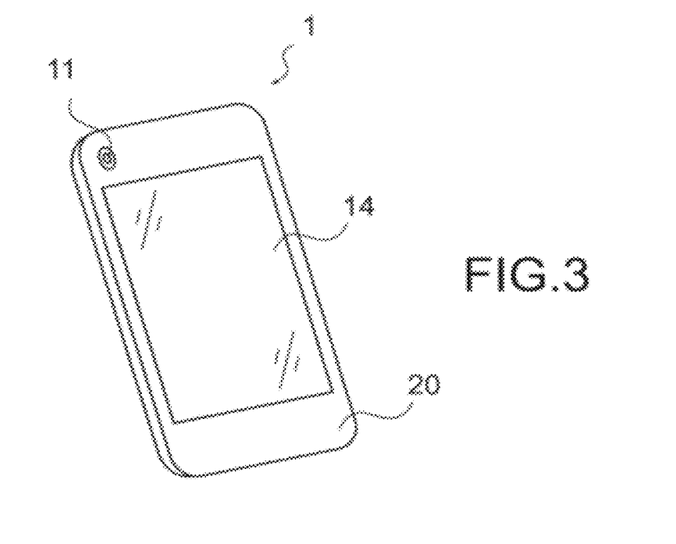
FIG. 3 is a perspective view showing an outer appearance of the information processing apparatus.

FIG. 1 is a block diagram showing a functional configuration of an information processing apparatus 1, and FIG. 2 is a block diagram showing a hardware configuration of the information processing apparatus 1. FIG. 3 is a perspective view showing an outer appearance of the information processing apparatus 1. Hereinafter, description will be given using a tablet PC (Personal Computer) as a specific example of the information processing apparatus 1, but the information processing apparatus 1 is not limited thereto. For example, the information processing apparatus 1 may be a personal digital assistant or a stationary PC.

As shown in FIG. 1, the information processing apparatus 1 includes a camera 11, a detection unit 12, a controller 13, and a display 14, and those components are connected to one another.

The camera 11 is a camera capable of capturing a digital image. The camera 11 can be a camera capable of capturing a moving image as successive still images, for example, a camera using an imaging device such as a CMOS (Complementary Metal Oxide Semiconductor) or a CCD (Charge Coupled Device). Hereinafter, an image captured with the camera 11 is referred to as a "captured image".

The detection unit 12 performs image processing on the captured image and detects an "opening degree of eye" of a user in the captured image. A specific detection operation by the detection unit 12 will be described later. The detection unit 12 outputs the detected "opening degree of eye" to the controller 13.

The controller 13 controls a presentation of the display 14 based on the opening degree of eye, which is detected in the detection unit 12. Specifically, the controller 13 controls software for generating a display image to be displayed on the display 14. It should be noted that examples of the software include system software such as an OS (Operating System) and application software that operates on the system software. Specific control on a presentation of the display 14 by the controller 13 will be described later.

The display 14 is a device capable of displaying an image. The display 14 may be a direct-view display such as an EL (Electroluminescence) display or a liquid crystal display, or may be a projection display such as a projector.

The display 14 has a display surface (display screen, projection surface of projector, etc.) that faces in the same direction as an imaging direction of the camera 11 (see FIG. 3). Specifically, the display 14 has a positional relationship with the camera 11, in which a face of a user falls within an imaging range of the camera 11 in the case where the user faces the display surface.

The functional configuration of the information processing apparatus 1 as described above is realized by the hardware configuration shown in FIG. 2. As shown in FIG. 2, the information processing apparatus 1 includes, in addition to the camera 11 and the display 14, a storage 15, a memory 16, a CPU (Central Processing Unit) 17, and an input IF (interface) 18. Those components above are connected to one another through a bus 19. It should be noted that the hardware configuration of the information processing apparatus 1 described herein is an example, and it is possible to adopt various configurations capable of realizing the functional configuration of the above-mentioned information processing apparatus 1.

The storage 15 is an auxiliary storage device such as an HDD (Hard Disk Drive) or an SSD (Solid State Drive) and stores programs to be subjected to computation processing by the CPU 17, data serving as a "display image" to be described later, and the like.

The memory 16 is a main storage device such as a DRAM (Dynamic Random Access Memory) and stores programs read from the storage 15 by the CPU 17, results of computation processing, and the like.

The CPU 17 reads programs from the memory 16 and executes computation processing. In other words, the information processing apparatus 1 functions with the CPU 17 as a subject of operations.

The input IF 18 is an input interface of the information processing apparatus 1 and can be input devices such as a touch panel, a keyboard, and a mouse. In particular, in the case where the display 14 is a direct-view display, the input IF 18 can be a touch panel.

The information processing apparatus 1 shown in FIG. 3 includes the display 14 and the camera 11 that are provided to a casing 20. The input IF 18 is integrally formed with the display 14. The storage 15, the memory 16, the CPU 17, the input IF 18, and the bus 19 are accommodated in the casing 20.

<Operation of Information Processing Apparatus>

Description will now be given on an operation of the information processing apparatus 1.

Figure 4:
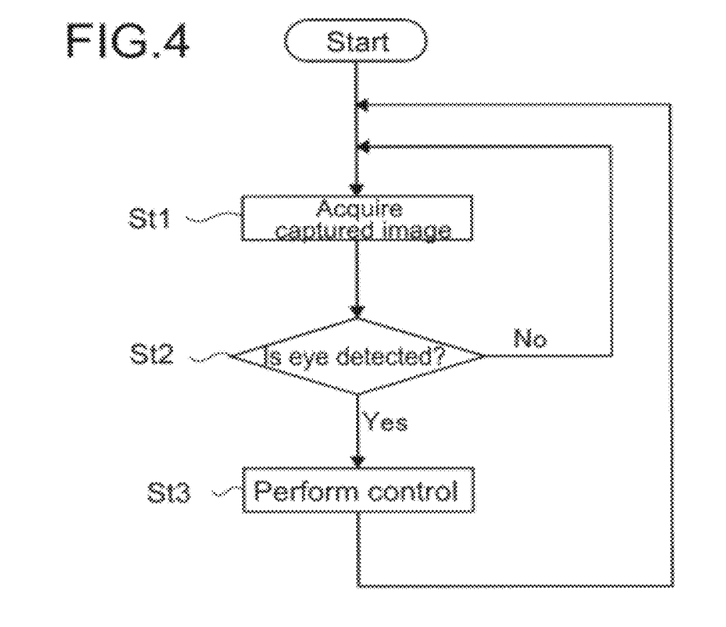
FIG. 4 is a flowchart showing an operation of the information processing apparatus.

FIG. 4 is a flowchart showing an operation of the information processing apparatus 1. FIG. 5 and FIG. 6 are schematic views showing an operation of the information processing apparatus 1. Hereinafter, an operation of the information processing apparatus 1 will be described for each step (St) of the flowchart shown in FIG. 4.

Figure 5A:
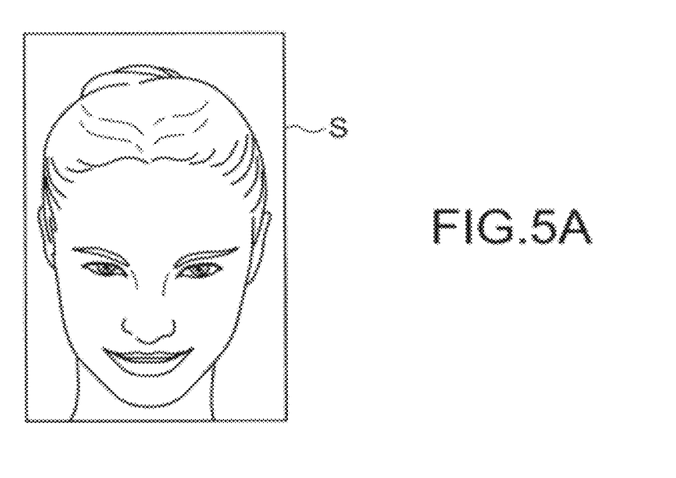
FIG. 5 are schematic views showing an operation of the information processing apparatus.

First of all, the camera 11 captures an image in an imaging direction thereof and acquires a captured image (St1). Imaging with use of the camera 11 may be successive (may capture images as a moving image) or may be intermittent (may capture several images per second, for example). Here, it is assumed that a captured image S shown in FIG. 5A is captured with the camera 11. It should be noted that the captured image S is an image to be internally processed in the information processing apparatus 1 and is not an image to be displayed on the display 14. The camera 11 outputs the captured image S to the detection unit 12.

Here, as described above, the display 14 and the camera 11 of the information processing apparatus 1 have a positional relationship in which the display surface of the display 14 faces in the same direction as the imaging direction of the camera 11. Therefore, in the case where the user is looking at the display 14 except the case where the user is looking at the display surface at a significantly oblique angle, the face of the user falls within the imaging range of the camera 11, that is, the face of the user is included in the captured image S.

Figure 5B:
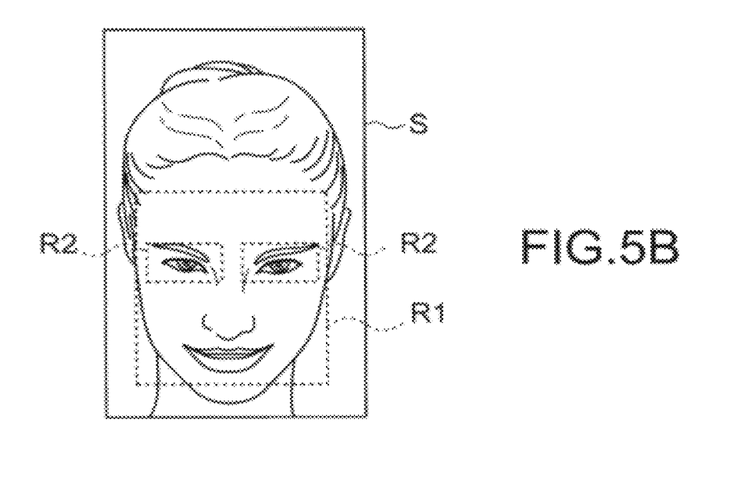

The detection unit 12 executes detection processing of an eye of the user in the captured image S (St2). Specifically, the detection unit 12 first detects a "face region" in the captured image S. The "face region" refers to a region that is detected as a face of the user in the captured image S. FIG. 5B schematically shows a face region R1 that is set for the captured image S exemplified in FIG. 5A by the detection unit 12. The detection unit 12 can detect the face region R1 by template matching using a characteristic pattern (template) of a human face. Further, the detection unit 12 can also detect the face region R1 by algorithms other than template matching.

Next, the detection unit 12 sets an "eye search region" in the face region R1. FIG. 5B shows an eye search region R2. The eye search region is a region that is predicted to include an eye in the face region R1 by the detection unit 12. The detection unit 12 can set an eye search region based on the size, orientation, aspect ratio, and the like of the face region R1. This is because the position of an eye in a human face generally falls within a certain range, although there are differences between individuals.

Figure 5C:
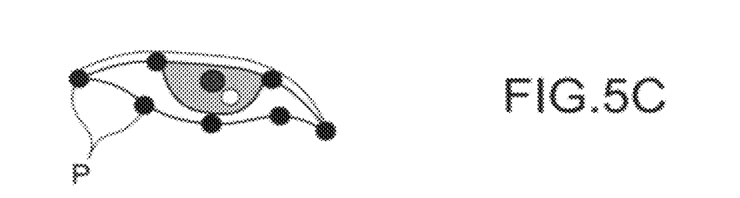

Subsequently, the detection unit 12 performs detection processing of a "feature point" on an image region included in the eye search region R2. FIG. 5C is a schematic view showing a detection result of feature points P. The feature points P are characteristic points on luminance of pixels in the image region. For example, the detection unit 12 can set, as a feature point P, a point of intersection of two edges detected by edge detection. In addition, the detection unit 12 can detect a feature point P by various algorithms other than edge detection.

Since the detection unit 12 only has to execute the detection processing of feature points on the image region included in the eye search region, the detection unit 12 can detect a feature point P at high accuracy and high speed, compared to the case where the same processing is executed for the entire image.

Figure 6A:
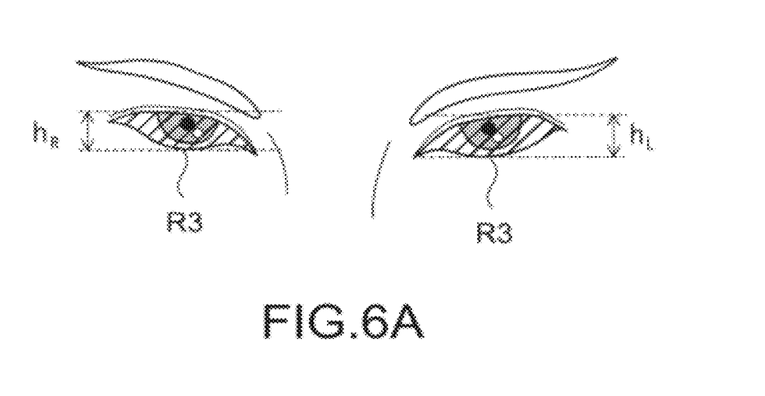
FIG. 6 are schematic views showing an operation of the information processing apparatus.
Figure 6B:
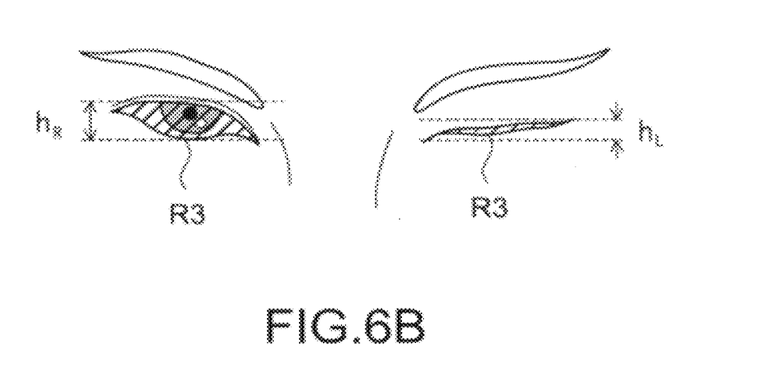

The detection unit 12 can determine a region surrounded by feature points P thus detected, to be an eye region of the user (hereinafter, referred to as "eye region"). FIG. 6A is a schematic view showing an eye region R3 that is detected by the detection unit 12 in the captured image S. FIG. 63 is a schematic view showing an eye region R3 that is detected by the detection unit 12 in a captured image (in which a user closes one eye), which is different from the captured image S.

The detection unit 12 extracts an "opening degree of eye" from the eye region R3. The opening degree of eye can be defined based on an area of the eye region R3, the height of the eye region R3, or a combination thereof. FIG. 6A and FIG. 6B each show the height of the eye regions R3 (height $h_R$ of right eye region and height $h_L$ of left eye region). The detection unit 12 outputs the opening degree of eye in the eye region R3 to the controller 13.

The controller 13 controls a presentation of the display 14 based on the opening degree of eye (St3). The controller 13 can control a presentation of the display 14 based on the opening degree of eye of a user, specifically, a change with time in the opening degree of eye and a difference in the opening degree of eye between right and left eyes of the user. The change with time in the opening degree of eye can be obtained as an amount of change in area or an amount of change in height of the eye region R3. Further, the difference in the opening degree of eye between right and left eyes of the user can be obtained as an area ratio of the right and left eye regions R3 or a height ratio thereof. A specific example of control by the controller 13 in accordance with the opening degree of eye of the user will be described later. After the above processing, the process is repeated again from acquisition of a captured image (St1).

The information processing apparatus 1 operates as described above. It should be noted that the controller 13 can additionally perform the following operation in the above-mentioned process.

[Removal of Blink]

As described above, the controller 13 controls a presentation of the display 14 based on an opening degree of eye of a user, which is detected in a captured image that is captured at a certain instant. However, there is a case where the user blinks without intending to operate the information processing apparatus 1, and if the presentation of the display 14 is controlled based on an opening degree of eye in a captured image that is captured at that instant, it is inconvenient.

In this regard, the information processing apparatus 1 can remove such influence caused by a blink of the user. Specifically, in the case where the each of opening degrees of both eyes of the user, which are output from the detection unit 12, is changed in the order of an opened state, a closed state, and an opened state within a certain period of time, the controller 13 ignores the "closed" state, with the result that the controller 13 can avoid reflecting a blink of the user on the control of the presentation of the display 14.

[Calibration of Size of Eye]

Although the control on a presentation of the display 14 is executed in accordance with an opening degree of eye of a user in the information processing apparatus 1, the size of eye is different between individuals. In other words, an opening degree of eye, which is detected in a certain captured image, includes an opening degree of eye of the user in a normal state and an opening degree of eye of the user in a state where the user narrows his/her eye. Accordingly, the size of eye of the user in the normal state has to be set as a reference.

In this regard, the information processing apparatus 1 can execute calibration based on the size of eye of the user in the normal state. Specifically, the controller 13 can hold values indicating the size of eye of the user during a predetermined period of time and set its maximum value to be the size of eye of the user in the normal state. Further, in the case where the information processing apparatus 1 is used by a plurality of users, the controller 13 may identify an individual user included in a captured image by an arbitrary face recognition algorithm and associate the individual user with a maximum value of the size of eye.

[Navigation of Opening Degree of Eye]

In the above-mentioned calibration of the size of eye, the information processing apparatus 1 may perform navigation of the opening degree of eye for the user. Specifically, the information processing apparatus 1 can display on the display 14 messages such as "Open your eyes to the maximum extent." and "Narrow your eyes." and can use the size of eye thus obtained at that time for the calibration described above.

[Presentation Indicating that Operation by Means of Eye is Effective]

In the case where an opening degree of eye is output from the detection unit 12, that is, in the case where a face of a user falls within an imaging range of the camera 11, the controller 13 can display on the display 14 a presentation indicating that an operation by means of eye is enabled.

Figure 7A:
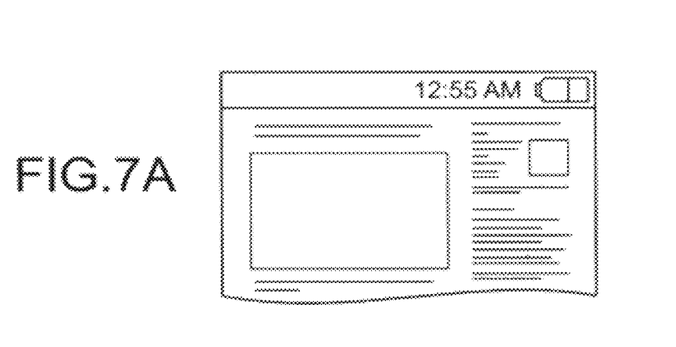
FIG. 7 are schematic views showing an operation of the information processing apparatus.
Figure 7B:
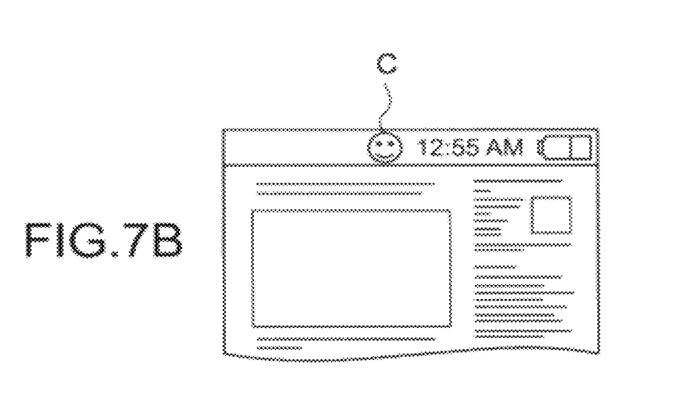

FIG. 7 shows a specific example of the presentation. FIG. 7A shows an example of a display image to be displayed on the display 14 when the detection unit 12 does not detect an eye of a user, and FIG. 7B shows an example of a display image to be displayed on the display 14 when the detection unit 12 detects an eye of a user. As shown in FIG. 7B, the controller 13 can display an icon C indicating that an eye has been detected, on a status bar or the like of the display 14.

With this presentation, by looking at the display 14 at first glance, the user can grasp that the information processing apparatus 1 is allowed to be operated based on the opening degree of eye.

CONTROL EXAMPLE OF CONTROLLER

Description will be given on a control example of a presentation of the display 14 by the controller 13 in accordance with an opening degree of eye of a user.

Control Example 1

Switching of Application to be Displayed

FIG. 8 are schematic views showing an operation of the information processing apparatus 1 according to Control example 1. Assuming that a user looks at the display 14 and a captured image S1 (FIG. 8A) is captured with the camera 11, the detection unit 12 outputs an opening degree of eye to the controller 13 as described above. The controller 13 causes the display 14 to display an image of a first application under execution (for example, audio file reproduction application) as a display image G1 (FIG. 8B).

Figure 8A:
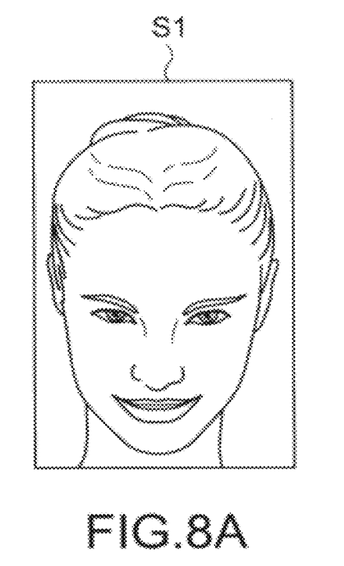
FIG. 8 are schematic views showing an operation according to Control example of the information processing apparatus.
Figure 8B:
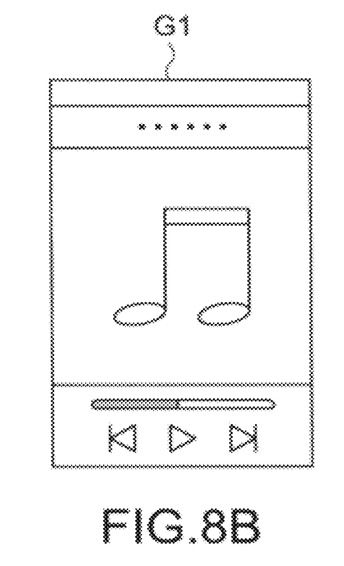
Figure 8C:
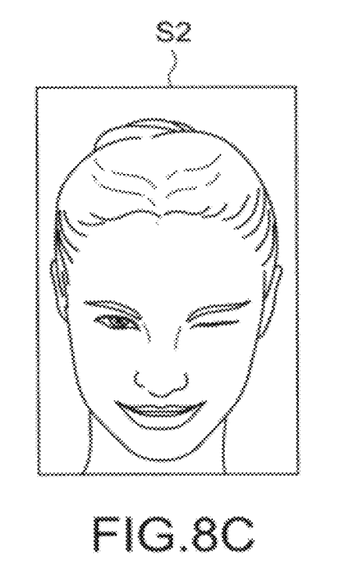
Figure 8D:
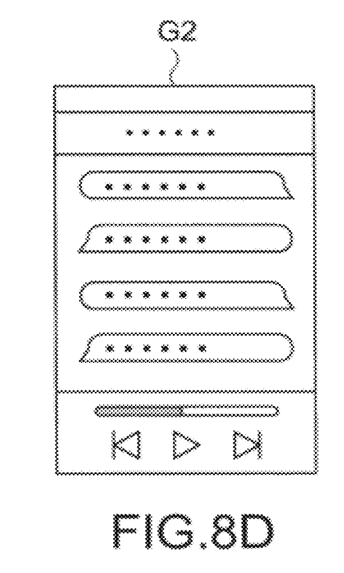

Next, assuming that the user closes one eye and a captured image S2 (FIG. 8C) is captured with the camera 11, the controller 13 determines, based on an opening degree of eye, that the user closes one eye and causes the display 14 to display an image of a second application under execution in a multitasking manner (for example, application for chatting) as a display image G2 (FIG. 8D). For example, in the case where an area ratio or a height ratio of the right and left eye regions R3 is equal to or larger than a predetermined value, the controller 13 can switch an application for generating a display image from the first application to the second application.

In other words, by closing one eye with the first application being displayed on the display 14, the user can causes the display 14 to display the second application without operating the information processing apparatus 1 with his/her hands and fingers. For example, the user can check presence or absence of a new message in a chat.

When the user opens the eyes again, the controller 13 determines, based on the opening degrees of eyes output from the detection unit 12, that both eyes of the user are opened, and causes the display 14 to display the display image G1.

It should be noted that when the user operates the touch panel and the like with the user's one eye being closed, that is, with the display image G2 being displayed (when the user intends to operate the second application), the controller 13 can fix the second application by which the display image G2 is generated, irrespective of the opening degree of eye obtained thereafter.

In this control example, the controller 13 switches a presentation between the first application and the second application by the user closing one eye. However, by the user closing both eyes, for example, the controller 13 switches a presentation between those applications. Further, the controller 13 may switch an application to be displayed, based on which of the right eye and the left eye the user closes.

In addition, in this control example, the controller 13 switches a presentation between two applications on the basis of the opening degree of eye, but the control example is not limited thereto. The controller 13 can switch between main content and sub-content in a single application, for example, a document and its bookmark, or a moving image and its operation interface, on the basis of the opening degree of eye.

Furthermore, the controller 13 may control activation or exit of an application based on the opening degree of eye.

Control Example 2

Display Magnification Scaling

FIG. 9 are schematic views showing an operation of the information processing apparatus 1 according to Control example 2. Assuming that a user looks at the display 14 and a captured image S3 (FIG. 9A) is captured with the camera 11, the detection unit 12 outputs an opening degree of eye in the captured image S3 to the controller 13 as described above. The controller 13 causes the display 14 to display a specific image (display target image) at a predetermined display magnification, as a display image G3 (FIG. 9B).

Figure 9A:
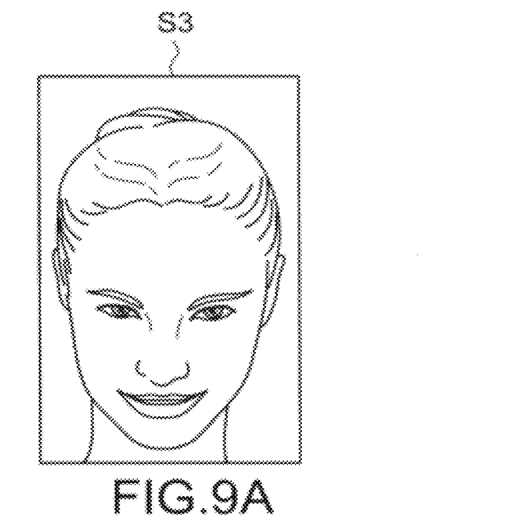
FIG. 9 are schematic views showing an operation according to Control example of the information processing apparatus.
Figure 9B:
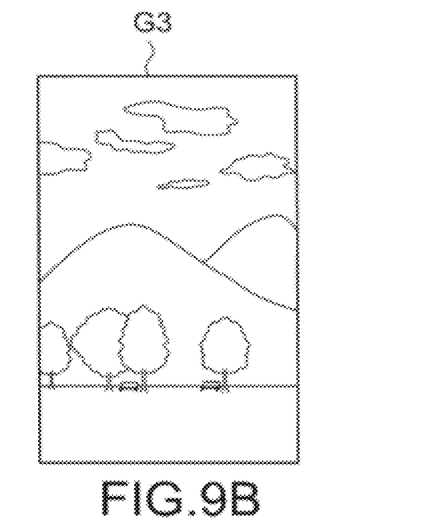
Figure 9C:
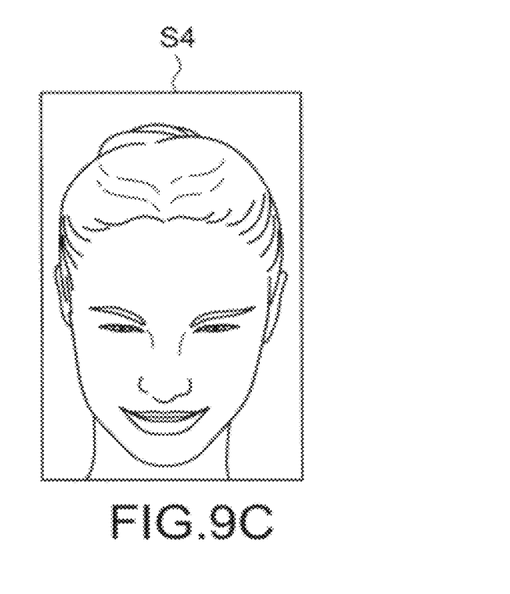
Figure 9D:
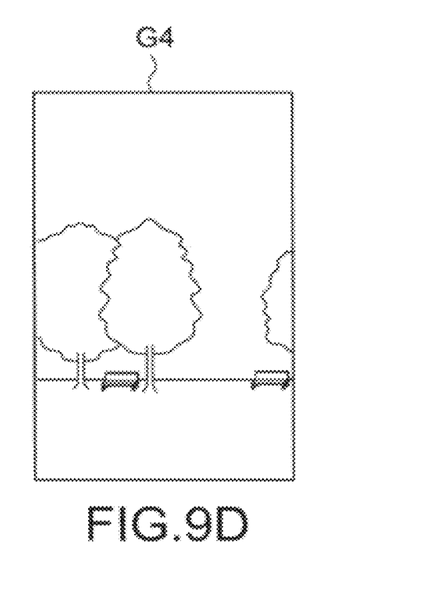

Next, assuming that the user narrows his/her eyes and a captured image S4 (FIG. 9C) is captured with the camera 11, the controller 13 causes the display 14 to display an image obtained by increasing the display magnification of the display target image in accordance with the opening degrees of eyes, as a display image G4 (FIG. 9D). The controller 13 may change the display magnification of the display target image in accordance with the opening degrees of eyes in a stepwise manner or in a seamless manner. The controller 13 can change the display magnification in accordance with, for example, an amount of change in area or an amount of change in height of the right and left eye regions R3.

In other words, by narrowing the eyes with an arbitrary image being displayed on the display 14, the user can enlarge the display image without operating the information processing apparatus 1 with his/her hands and fingers.

When the user opens the eyes again to a large extent, the controller 13 returns the display magnification of the display target image to the original one in accordance with the opening degrees of eyes output from the detection unit 12, and causes the display 14 to display a display image G3.

It should be noted that when the display image is displayed at a predetermined display magnification and the user operates the touch panel and the like, the controller 13 may fix a display magnification to that magnification, and cause a display image at that magnification to be displayed thereafter irrespective of the opening degrees of eyes.

In this control example, the controller 13 increases the display magnification when the user narrows his/her eyes. On the other hand, however, the controller 13 can also decrease the display magnification when the user narrows his/her eyes.

Control Example 3

Enlargement of Layout Region

FIG. 10 are schematic views showing an operation of the information processing apparatus 1 according to Control example 3. Assuming that a user looks at the display 14 and a captured image S5 (FIG. 10A) is captured with the camera 11, the detection unit 12 outputs an opening degree of eye in the captured image S5 to the controller 13 as described above.

Figure 10A:
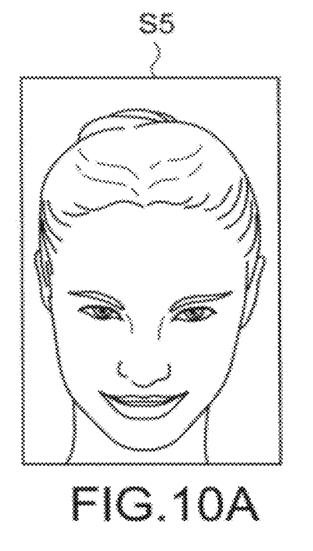
FIG. 10 are schematic views showing an operation according to Control example of the information processing apparatus.
Figure 10B:
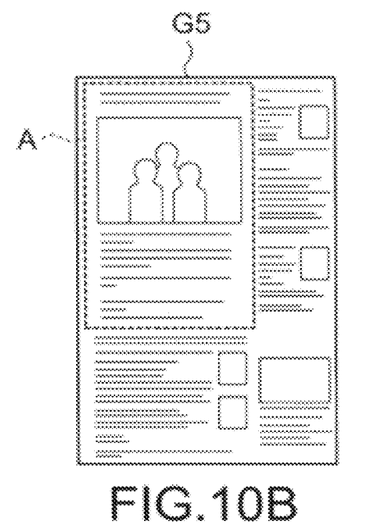
Figure 10C:
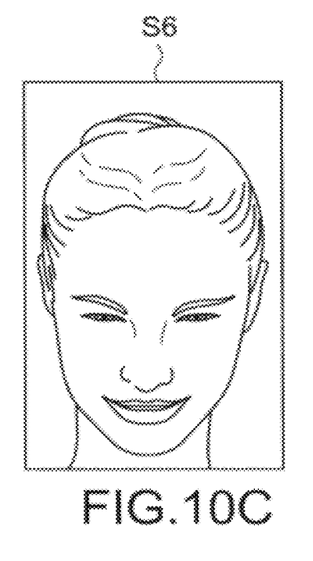
Figure 10D:
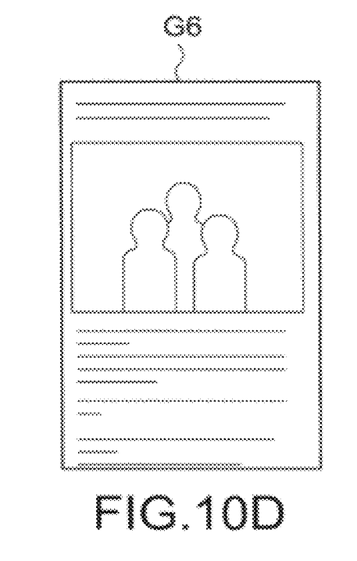

The controller 13 causes the display 14 to display an "image including a plurality of layout regions" (display target image) as a display image G5 (FIG. 10B). The layout region means a unit region of layout including an image and a text. The image including a plurality of layout regions is an image on a website, for example. Typically, an image on a news site corresponds to the image including a plurality of layout regions, and one article of the news site corresponds to the layout region. In a display image G5 shown in FIG. 10B, one layout region A is indicated by a broken line.

Next, assuming that the user narrows his/her eyes and a captured image S6 (FIG. 10C) is captured with the camera 11, the controller 13 causes the display 14 to display only a specific layout region of the display target image as a display image G6 (FIG. 10D) based on the opening degrees of eyes of the captured image S5 and those of the captured image S6. The layout region set as the display image G6 can be, for example, a layout region that is located closest to the center of the image in the display image G5 and occupies the largest portion of the image. For example, in the case where an amount of change in area or an amount of change in height of the right and left eye regions R3 is equal to or larger than a predetermined value, the controller 13 can cause the display 14 to display the specific layout region described above.

In other words, by narrowing the eyes while viewing an image including a plurality of layout regions, such as a website, the user can cause only a predetermined layout region to be displayed without operating the information processing apparatus 1 with his/her hands and fingers.

When the user opens the eyes again to a large extent, the controller 13 causes the display 14 to display the display target image including a plurality of layout regions as a display image G5.

As described in the control examples above, the controller 13 can control a presentation of the display 14 based on the opening degree of eye that is output from the detection unit 12.

Modified Example 1

In the above description, the detection unit 12 sets a feature point to detect an opening degree of eye. However, using a "luminance distribution", the detection unit 12 can also detect an opening degree of eye. Specifically, the detection unit 12 operates as follows.

First of all, the detection unit 12 detects a face region R1 by template matching or the like as described above and sets an eye search region R2 based on the size, orientation, aspect ratio, and the like of the face region R1 (see FIG. 5B).

Figure 11:
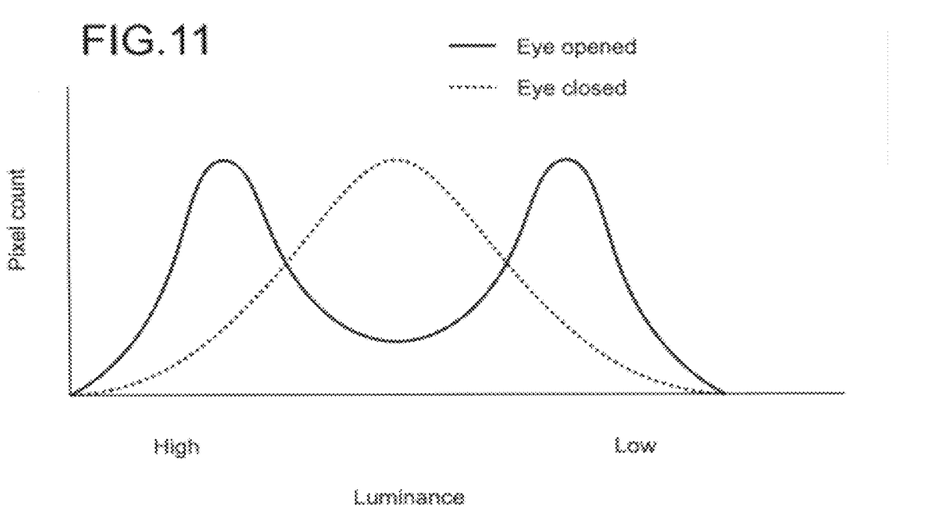
FIG. 11 is a graph showing a luminance distribution used for detecting an opening degree of eye in the information processing apparatus.

Subsequently, the detection unit 12 acquires a luminance distribution of pixels included in the eye search region R2. FIG. 11 is a conceptual graph showing a luminance distribution of pixels included in the eye search region R2. As shown in FIG. 11, when the user opens his/her eye, the luminance distribution has its peaks in a "high" part and a "low" part because of the presence of white and black of the eye. On the other hand, when the user closes his/her eye, the white and the black of the eye are absent, and therefore the luminance distribution has its peak at the midpoint of the "high" part and the "low" part. Further, in the case where the user narrows his/her eye, an intermediate plot between two plots is obtained. In other words, the detection unit 12 can determine the opening degree of eye based on the position of the peak.

Therefore, the detection unit 12 can detect the opening degree of eye of the user included in the captured image by means of this luminance distribution, and the controller 13 can control a presentation of the display 14 based on the opening degree of eye.

Modified Example 2

In the above description, the detection unit 12 sets a feature point to detect an opening degree of eye. However, using "template matching", the detection unit 12 can also detect an opening degree of eye. Specifically, the detection unit 12 operates as follows.

First of all, the detection unit 12 detects a face region R1 by template matching or the like as described above and sets an eye search region R2 based on the size, orientation, aspect ratio, and the like of the face region R1 (see FIG. 5B). It should be noted that in this modified example, the setting of the eye search region R2 is not necessarily performed, but the setting allows a time for performing template matching to be shortened.

Subsequently, the detection unit 12 executes template matching using a template of eyes with respect to the eye search region R2 or the entire captured image. For example, the detection unit 12 uses a plurality of templates with different opening degrees of eyes to thereby determine an opening degree of eye.

Therefore, the detection unit 12 can detect the opening degree of eye of the user included in the captured image by means of template matching, and the controller 13 can control a presentation of the display 14 based on the opening degree of eye.

The present disclosure is not limited to the embodiment described above and may be variously modified without departing from the gist of the present disclosure.

It should be noted that the present disclosure can take the following configurations.

(1) An information processing apparatus, including:
an imaging unit configured to capture an image to acquire a captured image;
a display having a display surface that faces in the same direction as an imaging direction of the imaging unit;
a detection unit configured to perform imaging processing on the captured image to detect an opening degree of eye of a user in the captured image; and
a controller configured to control a presentation of the display based on a result of the detection by the detection unit.

(2) The information processing apparatus according to Item (1), in which
the detection unit detects a face region that is a region of a face of the user in the captured image and sets an eye search region that is predicted to include an eye of the user in the face region, to execute the imaging processing for the eye search region.

(3) The information processing apparatus according to Item (1) or (2), in which
the controller controls the presentation of the display based on a change with time in the opening degree of eye.

(4) The information processing apparatus according to any one of Items (1) to (3), in which
the controller controls the presentation of the display based on a difference in the opening degree of eye between a left eye and a right eye of the user.

(5) The information processing apparatus according to any one of Items (1) to (4), in which
the detection unit detects an area of an eye region that is a region of an eye of the user, as the opening degree of eye, and
the controller controls the presentation of the display in accordance with one of an amount of change in area and an amount of change in height of the eye region.

(6) The information processing apparatus according to any one of Items (1) to (5), in which
the detection unit detects an area of an eye region that is a region of an eye of the user, as the opening degree of eye, and the controller controls the presentation of the display in accordance with one of an area ratio and a height ratio in the eye region between the left eye and the right eye of the user.

(7) The information processing apparatus according to any one of Items (1) to (6), in which
the controller changes a display magnification of a display target image in accordance with one of the amount of change in area and the amount of change in height to cause the display to display the display target image.

(8) The information processing apparatus according to any one of Items (1) to (7), in which
the controller fixes the display magnification when the user performs an input operation.

(9) The information processing apparatus according to any one of Items (1) to (8), in which
the controller causes the display to display a specific layout region of a display target image when one of the amount of change in area and the amount of change in height is equal to or larger than a predetermined value.

(10) The information processing apparatus according to any one of Items (1) to (9), in which
the controller causes the display to display, as the specific layout region, a layout region of the display target image, the layout region being located at a center of the display.

(11) The information processing apparatus according to any one of Items (1) to (10), in which
the controller changes an application for generating a display image to be displayed on the display when one of the area ratio and the height ratio is equal to or larger than a predetermined value.

(12) The information processing apparatus according to any one of Items (1) to (11), in which
the controller fixes, when the user performs an input operation, the application for generating a display image irrespective of the area ratio and the height ratio to be obtained thereafter.

(13) The information processing apparatus according to any one of Items (1) to (12), in which
the controller causes, when the opening degree of eye is detected by the detection unit, the display to display a presentation indicating that the opening degree of eye is detected.

(14) The information processing apparatus according to any one of Items (1) to (13), in which
the controller executes calibration for a size of an eye of the user based on a maximum value of the opening degree of eye within a predetermined period of time.

(15) A program causing a computer to function as:
a detection unit configured to perform imaging processing on a captured image captured by an imaging unit to detect an opening degree of eye of a user in the captured image; and
a controller configured to control a presentation of a display having a display surface that faces in the same direction as an imaging direction of the imaging unit, based on a result of the detection by the detection unit.

The present disclosure contains subject matter related to that disclosed in Japanese Priority Patent Application JP 2011-131120 filed in the Japan Patent Office on Jun. 13, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    circuitry configured to
        detect an opening degree of a left eye of a user and an opening degree of a right eye of the user in a captured image,
        determine a difference between the opening degrees of the left and right eyes of the user by determining a ratio between the opening degrees of the left and right eyes, and
        determine a predetermined function based on the determined difference between the opening degrees of the left and right eyes of the user.

2. The information processing apparatus according to claim 1, wherein the circuitry is configured to
    detect a face region that is a region of a face of the user in the captured image, and
    set an eye search region that is predicted to include the left and/or right eye of the user in the face region, and
    execute imaging processing for the eye search region.

3. The information processing apparatus according to claim 1, wherein the circuitry is configured to
    temporarily change the presentation of the display based on a change with time in the opening degree of the left eye and/or the right eye.

4. The information processing apparatus according to claim 3, wherein the circuitry is configured to
    detect an area of an eye region that is a region of the left and/or right eye of the user, and
    temporarily change the presentation of the display in accordance with one of an amount of change in area and an amount of change in height of the eye region.

5. The information processing apparatus according to claim 1, wherein the circuitry is configured to
    detect an area of an eye region that is a region of the left eye and the right eye of the user, and
    temporarily change the presentation of the display in accordance with one of an area ratio and a height ratio in the eye region between the left eye and the right eye of the user.

6. The information processing apparatus according to claim 4, wherein the circuitry is configured to
    temporarily change a display magnification of a display target image in accordance with one of the amount of change in area and the amount of change in height to cause a display to display the display target image.

7. The information processing apparatus according to claim 6, wherein the circuitry is configured to
    fix the display magnification when the user performs an input operation.

8. The information processing apparatus according to claim 4, wherein the circuitry is configured to
    temporarily change the presentation to display a specific layout region of a display target image when one of the amount of change in area and the amount of change in height is equal to or larger than a predetermined value.

9. The information processing apparatus according to claim 8, wherein the circuitry is configured to
    temporarily change the display to display, as the specific layout region, a layout region of the display target image, the layout region being located at a center of the display.

10. The information processing apparatus according to claim 5, wherein the circuitry is configured to
    change an application for generating a display image to be displayed on a display when one of the area ratio and the height ratio is equal to or larger than a predetermined value.

11. The information processing apparatus according to claim 10, wherein the circuitry is configured to
    fix, when the user performs an input operation, the application for generating the display image irrespective of the area ratio and the height ratio to be obtained thereafter.

12. The information processing apparatus according to claim 1, wherein the circuitry is configured to
    cause, when the opening degree of the left and/or right eye is detected, the display to display a presentation indicating that the opening degree of the left and/or right eye is detected.

13. The information processing apparatus according to claim 1, wherein the circuitry is configured to
    execute calibration for a size of the left and/or right eye of the user based on a maximum value of the opening degree of the left and/or right eye within a predetermined period of time.

14. A non-transitory computer-readable medium storing a program which when executed by a computer causes the computer to:
    detect an opening degree of a left eye of a user and an opening degree of a right eye of the user in a captured image;
    determine a difference between the opening degrees of the left and right eyes of the user by determining a ratio between the opening degrees of the left and right eyes; and
    determine a predetermined function based on determined difference between the opening degrees of the left and right eyes of the user.

15. The information processing apparatus according to claim 1, wherein the circuitry is configured to
    determine the predetermined function independent of which position on a display is viewed by the user.

* * * * *